Figure 1:
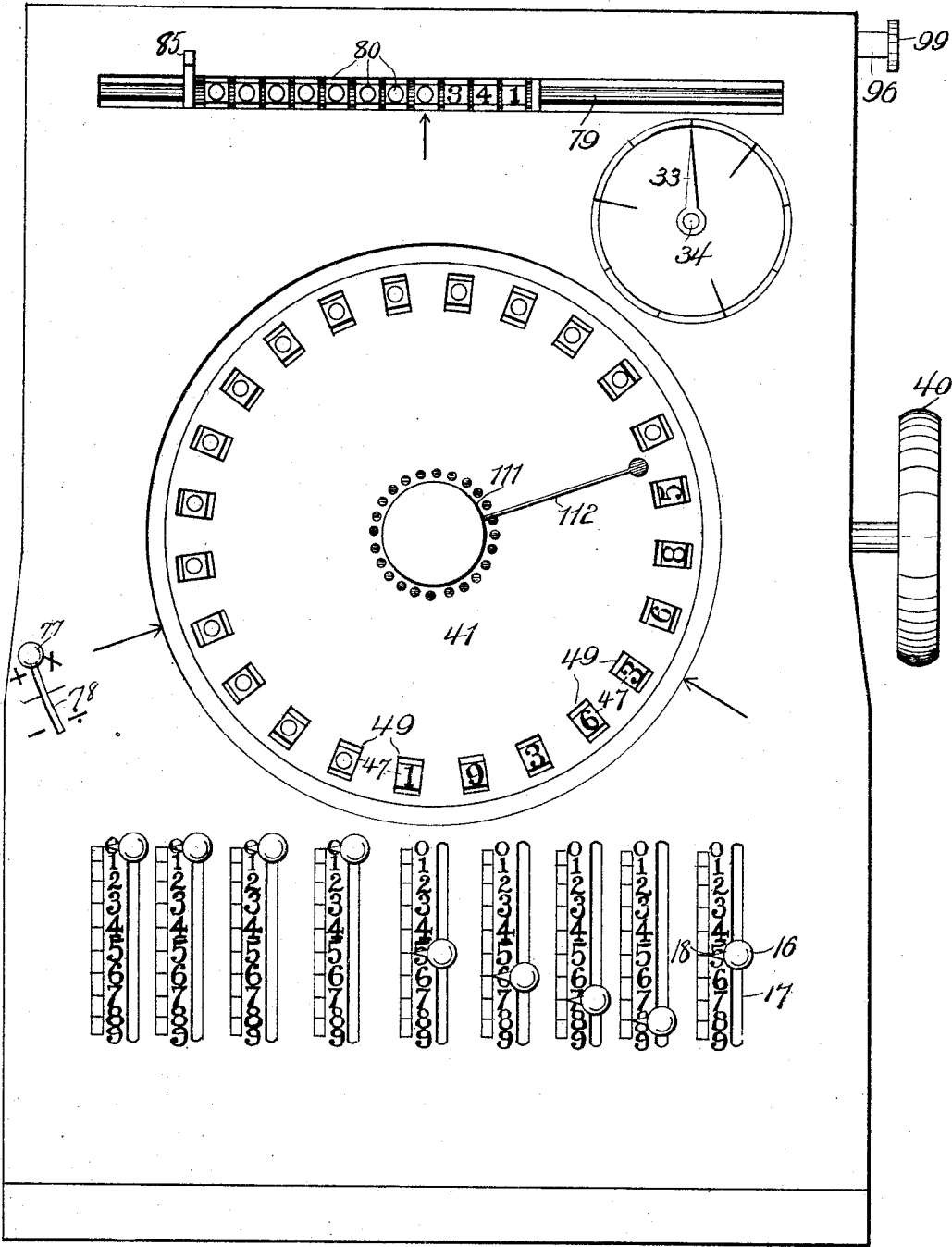

No. 781,364. PATENTED JAN. 31, 1905.
W. H. ROBERTSON.
CALCULATING MACHINE.
APPLICATION FILED JUNE 25, 1903.

5 SHEETS—SHEET 1.

WITNESSES:
G. F. Downing
J. W. Foster

INVENTOR
William H. Robertson
BY
H. A. Seymour
ATTORNEY

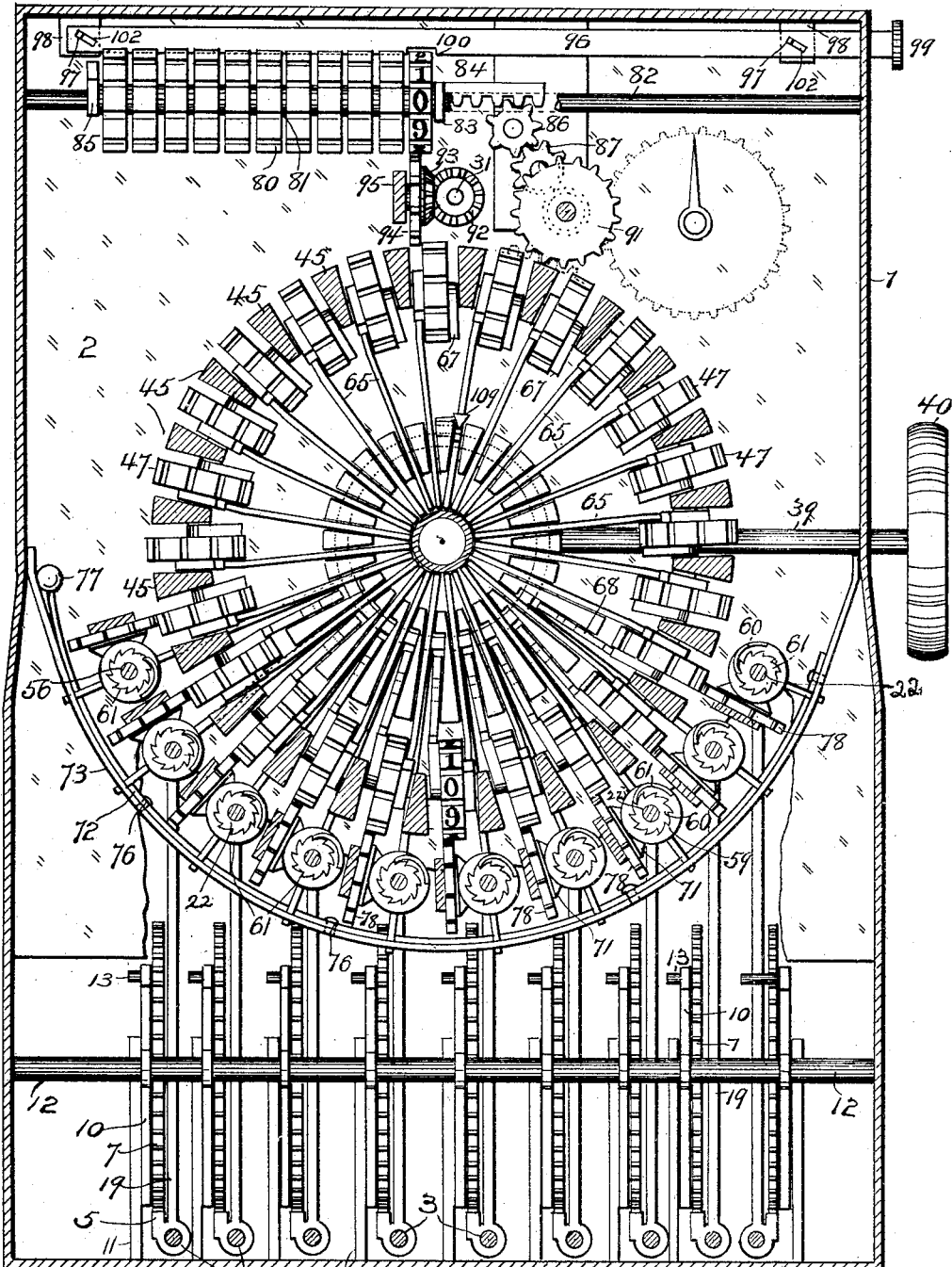

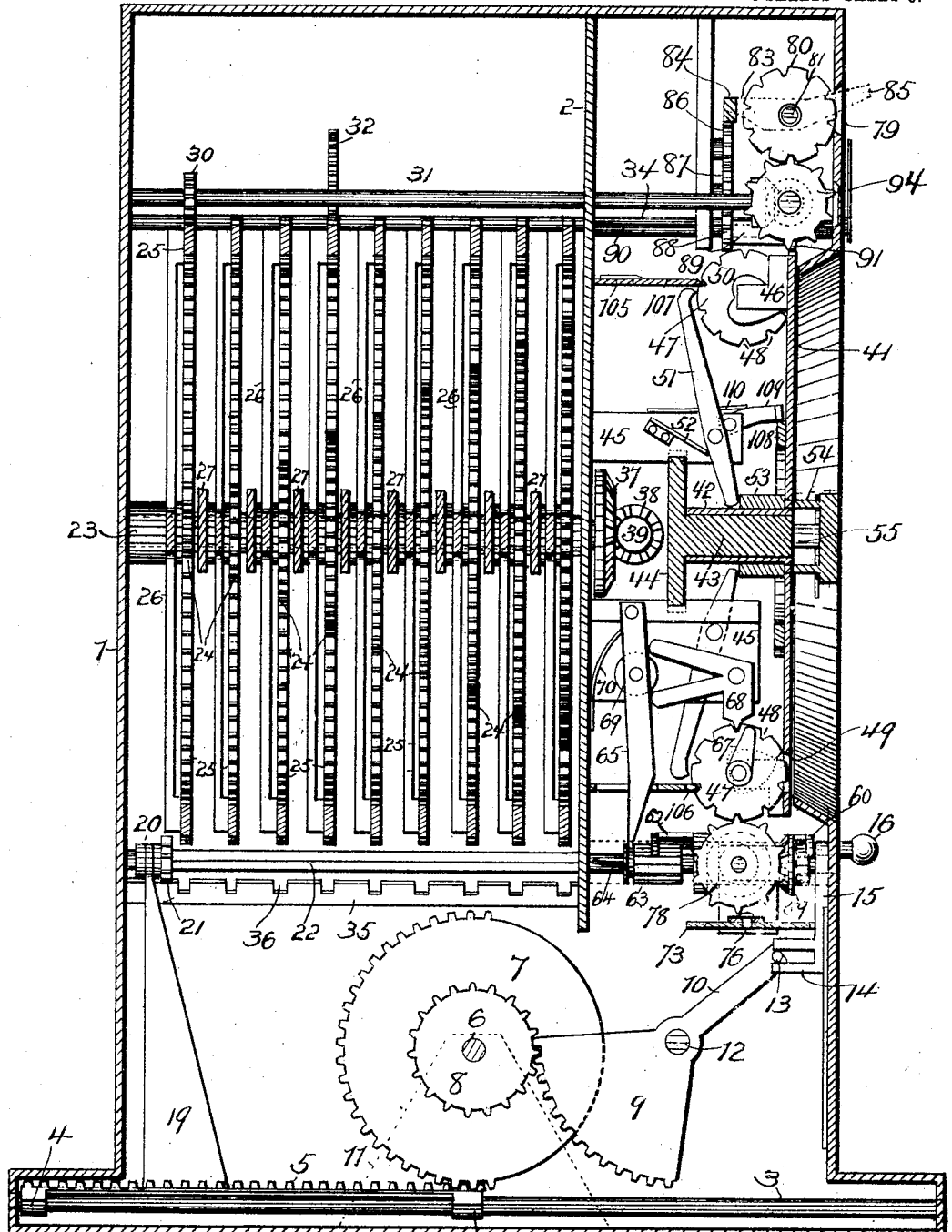

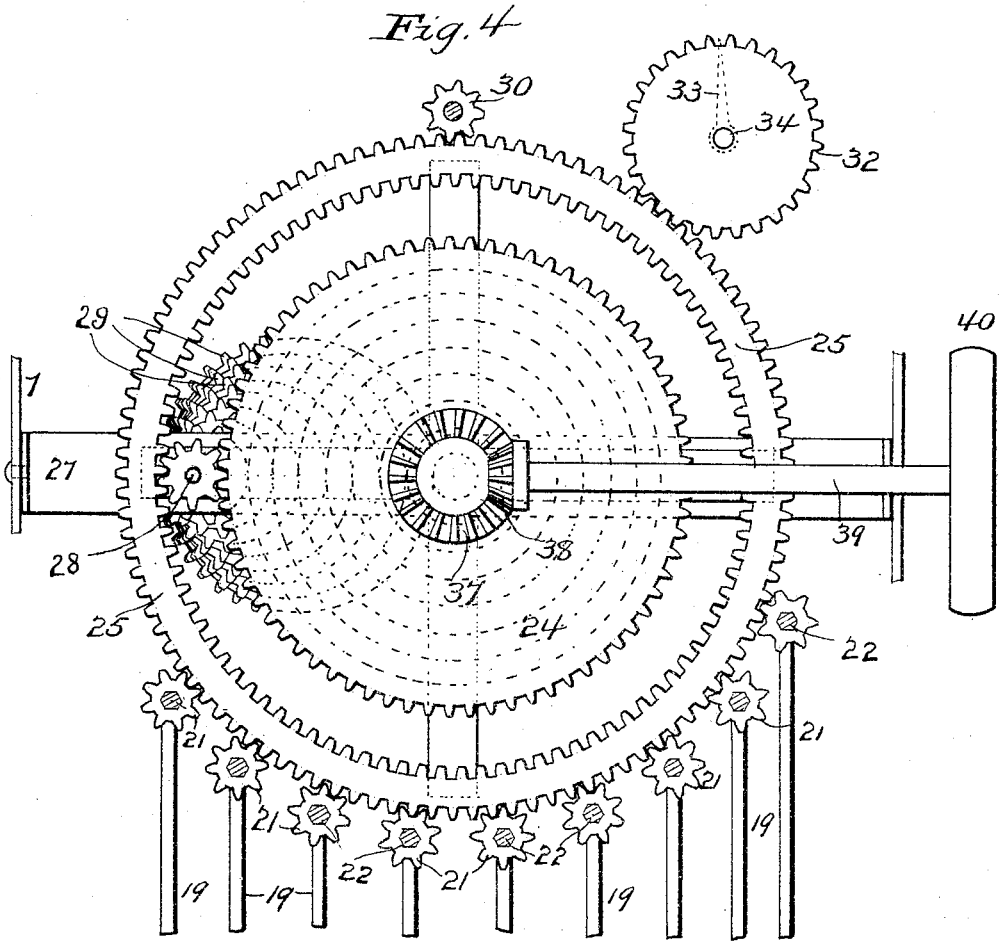

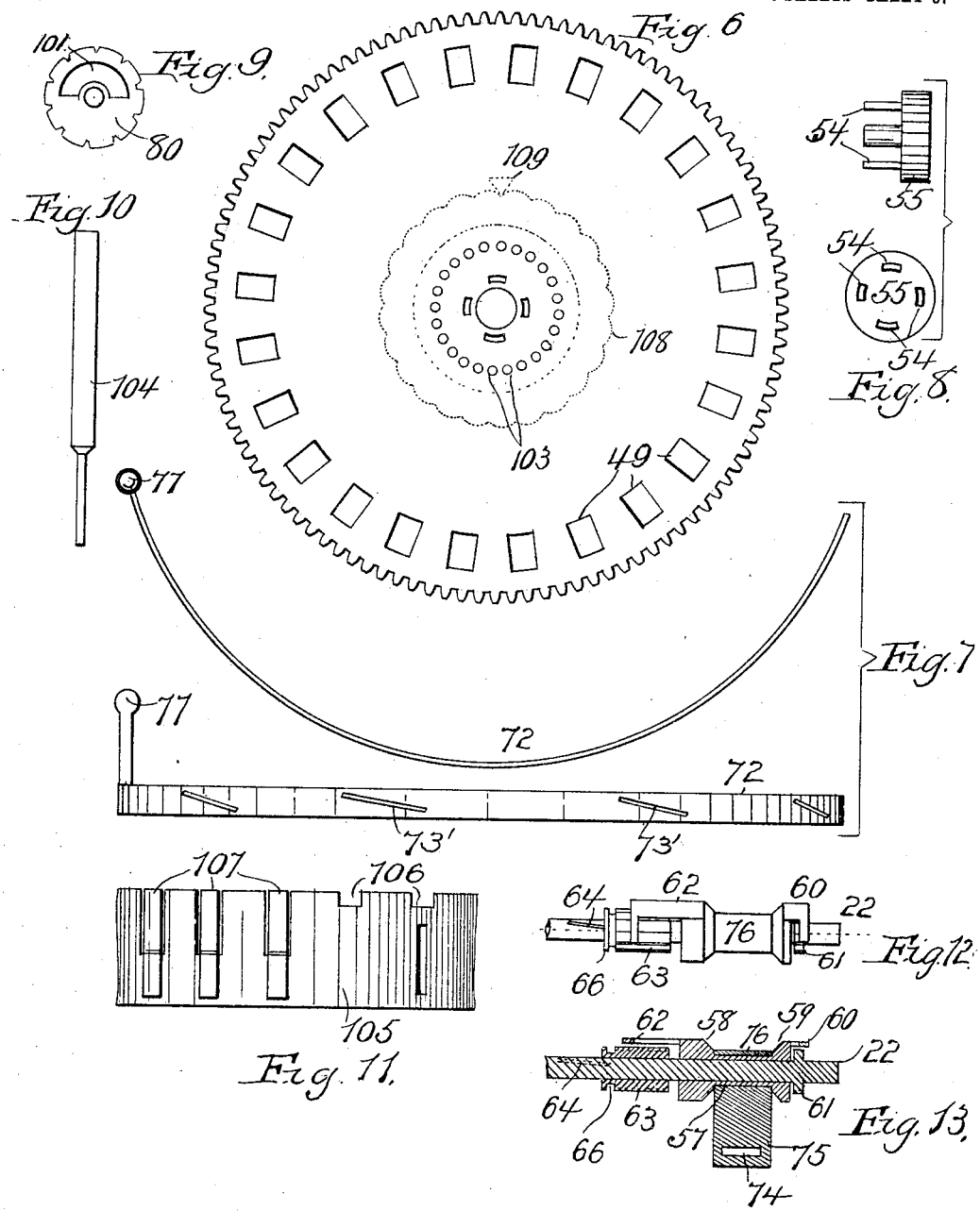

No. 781,364. Patented January 31, 1905.

UNITED STATES PATENT OFFICE.

WILLIAM H. ROBERTSON, OF WASHINGTON, DISTRICT OF COLUMBIA.

CALCULATING-MACHINE.

SPECIFICATION forming part of Letters Patent No. 781,364, dated January 31, 1905.

Application filed June 25, 1903. Serial No. 163,112.

*To all whom it may concern:*

Be it known that I, WILLIAM H. ROBERTSON, a resident of Washington, in the District of Columbia, have invented certain new and useful Improvements in Calculating-Machines; and I do hereby declare the following to be a full, clear, and exact description of the invention, such as will enable others skilled in the art to which it appertains to make and use the same.

My invention relates to an improved calculating-machine, the object of the invention being to provide an improved machine of this character capable of rapidly and accurately performing problems in multiplication, division, addition, and subtraction.

A further object is to provide an improved calculating-machine of unlimited capacity, rapid and simple in operation, of practical mechanical construction to minimize friction and wear, and consequently lengthen the life of the machine as well as make easy its separate operations.

With these objects in view the invention consists in certain novel features of construction and combinations and arrangements of parts, as will be more fully hereinafter described, and pointed out in the claims.

In the accompanying drawings, Figure 1 is a front view illustrating my improvements. Fig. 2 is a front view, partially in section, with the front removed. Fig. 3 is a view in vertical longitudinal section. Fig. 4 is a view illustrating a toothed rack and coöperating mechanism. Fig. 5 is a detail view of a cross-brace. Fig. 6 is the rotary front disk, and Figs. 7, 8, 9, 10, 11, 12, and 13 are views of various details of construction.

1 represents an approximately rectangular casing slightly enlarged at the front and rear of its base and provided with a vertical partition-plate 2. In the enlarged base portion of casing 1 a series of horizontal rods 3 are secured and on which sleeves or collars 4 at the ends of toothed racks 5 are mounted to slide, as shown in Fig. 3. Toothed wheels 7, Figs. 2 and 3, are mounted on pintles 6 at one side of standards 11 and engage the racks 5, and pinions 8 are secured to or made integral with said toothed wheels 7 and are in mesh with segments 9, Fig. 3, at one end of levers 10, which latter are fulcrumed on a common shaft 12 and are provided at their outer ends with laterally-projecting pins 13, located in bifurcated lugs 14 on sliding bars 15. To these bars 15 buttons 16 are secured and project through vertical slots 17 in the casing-front and carry pointers 18 to register with scales printed or otherwise marked on the casing beside the slots and running from "0" to "9" and for a purpose which will hereinafter appear.

Each rack 5 has secured thereto or made integral therewith an upright arm 19, Figs. 2 and 3, and the upper ends of these arms 19 are bifurcated or otherwise made to engage in annular grooves in the hubs 20 of pinions 21. The pinions 21 are keyed to slide, but locked to turn shafts 22, arranged in the arc of a circle concentric with a main shaft 23, as shown in Fig. 4, and extend from the rear to the front of casing 1 and through the partition-plate 2.

On main shaft 23 and secured to turn therewith are nine spur-wheels 24 of different diameter or size, as shown in Figs. 3 and 4, and having different numbers of teeth. The ratio of the number of teeth in the different spur-wheels 24 is the same as the ratio in the numbers in the decimal system from "1" to "9"

Internally and externally toothed circular or endless racks 25 encircle the spur-wheels 24 and have suitable spiders or arms 26. Cross bars or braces 27 are secured to the frame 1 and provided with shoulders to form bearings for the bars 26, and said bars 27 are also provided with pins or journals 28, on which connecting-gears 29, Fig. 4, are mounted, and said gears 29 meshing with the spur-wheels 24 and racks 25. These connecting-gears 29 must of course vary in diameter and number of teeth in order to connect the spur-wheels with their racks. When shaft 23 is turned, all of the racks 25 will be turned; but each will be moved a different distance, but always in a constant ratio one to the other—as, for instance, when the inner rack 25 is turned a distance of one tooth, the next rack two teeth, and so on to the outer rack, which will be moved a distance of nine teeth.

With the extreme inner or slowest-moving rack 25 at its upper edge a gear 30, Figs. 3 and 4, is always in mesh. This gear 30 is secured upon a shaft 31, extending to the front of casing 1, for operating my improved indicating mechanism, hereinafter described.

With one of the intermediate racks 25 a gear-wheel 32 is in mesh and is secured upon a shaft 34, projecting through the front of casing 1, on which a circular dial from "1" to "9" is marked, and a pointer 33 is secured upon this shaft to register with the dial and register the unit angles through which the racks are turned, and it will be understood that this gear-wheel 33 may be made to mesh with any of the racks, as by varying its size and number of teeth it will correctly turn the pointer to register the unit angles.

The pinions 21 above referred to are moved along shafts 22 to engage or mesh with any of the racks 25, and bars 35 are located below the shafts 22 and have their upper edges normally located between teeth of the pinions 21 to prevent turning thereof and guide the teeth of the pinions between the teeth of the racks in moving past them and into mesh with the rack desired, and said bars are made with notches 36 in alinement with the racks to permit the pinions 21 to be turned when in mesh therewith, but at no other time. As all of the racks move in a constant integral ratio to the slowest-moving rack at any stopping-points determined by a unit angle, which causes the slowest rack to move a tooth or a whole number of teeth, they will be in perfect alinement to permit the pinions 21 to pass to and from the rack 25, to which they are moved, without obstruction or interference by the racks and be in perfect mesh with any rack desired.

The main shaft 23 is provided at its forward end with a beveled gear 37, Figs. 3 and 4, with which another beveled gear, 38, on a shaft 39, meshes, and this shaft 39 projects through the side of casing 1 and has a knob 40 thereon, which is grasped by the operator and turned the proper number of unit angles, as indicated by pointer 33, hereinafter more particularly pointed out.

The front of casing 1 is made with a large conically-flanged opening, Fig. 3, behind which a circular plate 41 is located and having its central hub 42 mounted on a journal 43, which latter has notched arms or a plate 44, interlocking with notches in forwardly-projecting arms 45 on partition 2 to rigidly secure the journal in position to properly support the plate 41. Around the inner face of this plate 41 lugs or brackets 46 are secured and provide journals on which registering-wheels 47, Figs. 2 and 3, are mounted to turn, and these registering-wheels are arranged in annular series and equidistant from the journal 43, and consequently in a common endless train or circle. They are made with notches 48 in their periphery, by means of which motion is transmitted thereto and numbers from "0" to "9" are printed or otherwise made upon their periphery, which are exposed through openings 49 in plate 41. Each and every one of these registering-wheels 47 has secured thereto or made integral therewith a heart-shaped cam 50, Fig. 3, to be engaged by the free ends of levers 51 and return the registering-wheels to expose "0" at the openings 49. The levers 51 are fulcrumed between their ends on the arms 45, and springs 52 hold their outer ends against a band or sleeve 53 on the hub 42 of plate 41. Against this band or sleeve 52 the inner ends of lugs 54 on a button 55, Fig. 8, abut, said lugs passing through openings in the plate and upset or otherwise constructed to prevent their escape from the plate. It will thus be seen that when button 55 is pushed inward its lugs 53 will force inward the ends of levers 51, engaged by the band or sleeve 53, and consequently move the other ends of said levers, which are preferably made knife-edged, as shown, against the heart-shaped cams 50, returning all of the registering-wheels to "0." The button 55 also serves as one device to turn plate 41 and parts carried thereby, other means being hereinafter set forth in the description of my improved registering mechanism.

By reference to Fig. 2 it will be seen that there are nine shafts 22 with coöperating mechanism, the shaft 56 at the extreme left being an idler, but serving to support carrying mechanism similar in all respects to the carrying mechanism on the shafts 22, which will now be pointed out.

Each shaft 22 has loosely mounted thereon a sleeve 57, having integral facing beveled gears 58 and 59, respectively, at its ends, as shown in Fig. 13. The outer gear 59 has a spring-pawl 60 thereon engaging a ratchet-wheel 61, secured to shaft 22, to compel the sleeve 57 and gears 58 and 59 thereon to turn in one direction only. The inner gear 58 has a longer-armed pawl 62 thereon engaging elongated teeth or ribs of a ratchet-sleeve 63, which latter is keyed to shaft 22 by means of an inclined web 64 on the shaft, located in a corresponding shaped groove in the ratchet-sleeve, which when the ratchet-sleeve 63 is forced inward compels a forward rotary movement of the sleeve 57 and gears, any return movement being prevented by pawl 60 and ratchet-wheel 61.

The sliding movement of ratchet-sleeve 63 and consequent forward movement of the gears 58 and 59 is effected by means of a lever 65, Fig. 3, fulcrumed at its upper end on arm 45 and having its lower end located in an annular groove 66 in ratchet-sleeve 63, it being understood that the above-described carrying mechanism is common to all the shafts 22 and a shaft 56, Fig. 2, and a lever 65 is located between each of the shafts and operates the carrying mechanism to its left.

Each registering-wheel 47 has secured on its side face or made integral therewith a tappet 67, Fig. 3, so that at each revolution of a registering-wheel 47 its tappet 67 will engage a bell-crank lever 68. These bell-crank levers 68 are made with sharpened ends where they are engaged by the tappets 67 to enable them to pass through the notches 48 of wheels 47 and not interfere with the turning of plate 41. The opposite members of the bell-crank levers 68 are forked, as shown, to engage opposite sides of small rollers 69, located between the ends of levers 65, and move the levers 65 inward regardless of the direction of rotation of the wheels 47, the roller being provided to reduce friction. Springs 70 are secured to partition 2 and bear against the levers 68 to hold them in their outward position and return the carrying mechanism after operation to its normal set position.

Upon supports beside each sleeve 57 beveled gears 71, Fig. 2, are located and are when the machine is performing problems in multiplication or addition in mesh with the gears 58; but when the machine is to perform problems in division or subtraction the gears 71 are in mesh with gears 59. This shifting of the gears is effected by means of a slide-bar 72, Figs. 2 and 7, movable longitudinally upon a curved platform or shelf 73 and projecting through horizontal slots 74 in standards 75, Fig. 13, depending from and secured to or integral with collars or bands 76, surrounding sleeves 57. The slide-bar 72 is made with inclined slots 73' to receive pins or lugs 76 on the platform 73, so that when the bar is moved longitudinally, owing to the cam action of the slotted portions thereof against the pins 76, will move the standards and sleeve 57 to bring either of said gears 58 or 59 into mesh with gears 71, according to the direction of movement of the bar 72, as will be readily understood. This bar has an operating button or handle 77 projecting through a slot 78 in casing 1 and at the extreme ends of the slots are designated where the handle 77 must be to perform the work desired.

Secured to or otherwise locked to gears 71 are star-wheels 78, Fig. 2, the teeth of which engage the notches 48 in the periphery of wheels 47 to turn the latter. When a registering-wheel 47 is given a complete turn by its star-wheel 78, its tappet 67 will engage the bell-crank lever 68 to the left thereof, which latter will force its coöperating levers 65 inward and move inward the ratchet-sleeve 63 on the shaft 22. This movement of ratchet-sleeve 63, owing to the cam action of the inclined web 64, will turn gears 58 and 59 sufficiently to advance the registering-wheel to the left a distance of one numeral, and thus record the tens, and at each complete revolution of a registering-wheel 47 the registering-wheel at the left thereof will be turned a distance of one numeral.

The indicating mechanism hereinbefore referred to is located at the top of the casing, its indicator-wheels 80 being seen through an elongated slot 79 in the front of casing 1. These wheels 80 are mounted to turn on a tubular bearing 81, Fig. 2, located to slide on a shaft or rod 82, extending across the casing and secured at its ends thereto. Bars 83 at the ends of tube 81 support a rack 84 at the rear of the wheels 80, Figs. 2 and 3, and one of said bars has a handhold or extension 85, projecting through the slot 79 and affording ready means for the sliding of the tube and permit the operator to turn the wheels 80 with his finger or a suitable tool. The rack 84 is operated by a pinion 86, connected by an idler 87 with a gear 88, secured upon a sleeve 89, the latter being fixed to a rotary shaft 90 and carrying a pinion 91, meshing with the toothed periphery of plate 41 to turn the same or be turned thereby, as the case may be.

The shaft 31 before mentioned has a beveled gear 92 fixed thereto and in mesh with a beveled gear 93, secured to or integral with a star-wheel 94 on a suitable bracket-support 95 and in position to engage the notched periphery of an indicator-wheel 80, which may be moved into engagement therewith. A locking-bar 96 is located above the indicator-wheel 80 and is supported by pins 97 on depending arms 98, said pins being projected through inclined slots 102 in the bar and the latter extending at one end through the wall of casing 1, where it is provided with a push-button 99. The lower edge of this bar 96 rests in the alined notches of the indicator-wheels 80 and locks them against rotation; but it has a notch or recess 100 above star-wheel 94 to permit the rotation of an indicator-wheel in mesh therewith, locking all the others against movement. All of the indicator-wheels 80 are provided with counter-weights 101, Fig. 9, to return them to a position to expose the "0" on their peripheries at the slot 79, when they are released by elevating locking-bar 96, which is effected when the bar is pushed inward, the cam action of the inclined slots 102 therein engaging pins 97, causing the elevation of bar 96.

To permit any of the wheels 47 to be turned to "0" without affecting the others, I provide openings 103, Fig. 6, in plate 41, through which a bar 104, Fig. 10, can be inserted to engage a lever 51, operate cam 50, and return the desired wheel. To lock all of the wheels 47 against rotation save those in mesh with star-wheels 78, a ring 105, Fig. 3, is secured to partition 2 and is made with notches 106 opposite the star-wheels to permit the rotation of the wheels 47 in mesh therewith, and spring-tongues 107 are provided on the ring 105 to project into the notches of the other wheels 47 and effectually lock them against rotation, and the ring 105 is slotted to permit the free operation of levers 65.

The plate 41 has secured centrally around its axis a scalloped or ratchet ring 108, Figs. 3 and 6, with which a pivoted pawl 109 is held in engagement by a spring 110, secured to an arm 45, this ratchet-ring and pawl serving so cause the plate 41 to be turned to a position to properly locate the wheels 47 above the star-wheels 78.

Around the button 55 a band 111, Fig. 1, is provided, carrying a pointer 112, which can be moved to any position to indicate the decimal-point.

The operation of my improvements is as follows: I will describe the operation in performing problems in multiplication, addition, division, and substraction in the order stated and will say in advance that my improved machine performs its multiplication by continued additions and its division by continued subtractions. We will suppose it is desired to multiply fifty-six thousand seven hundred and eighty-five by three hundred and forty-one, which is the problem set forth in Fig. 1 of the drawings. The button 16 to the extreme right is moved down until its pointer registers with "5" on the scale, the next button moved down to "8," and so on until the number "56,785" is indicated by the button-pointers. This movement of the buttons 16, through the medium of lever 10, segment 9, gear 8, toothed wheel 7, and rack 5, will move the pinions 21 along shafts 22 to mesh with the proper racks 25—as, for instance, the first pinion to the right and the fifth from the right will both be in mesh with the fifth rack 25 from the rear, and the intermediate pinions 21, which are moved, will mesh with the sixth, seventh, and eighth racks 25, respectively. The operator then turns the knob 40 one unit-angle, which is the value of the lowest digit of the other member—that is to say, when knob 40 is turned it will, through the medium of shaft 39, gears 38 and 37, transmit motion to main shaft 23 to turn all of the nine spur-wheels 24. Each of these spur-wheels has a different diameter and number of teeth, the ratio of the number of teeth in the different wheels being the same as the ratio in the number in the decimal system from one to nine. When shaft 23 turns, all the spur-wheels 24 turn with it through the same angle and transmit motion to the connecting-gears 29 and they in turn to endless racks 25. As the connecting-gears 29 neither increase nor diminish the motion or speed given them, the racks 25 will turn through different angles, which angles will have the same ratio to each other as the circumferences of the inner driving spur-wheels 24. It will thus be seen that the rear or innermost rack 25 is the slowest moving and the forward or outer rack the fastest or most rapid, the intermediate racks moving in their respective ratio thereto. One of these racks 25 is in mesh with a gear 32 to turn shaft 34 and pointer 33, which registers with the dial and indicates the unit angles from one to nine. The inner or slowest-moving rack 25 transmits motion to gear 30 and shaft 31, which latter, through the medium of gears 92 and 93, turns star-wheel 94, and the latter turns the indicator-wheel 80 in mesh therewith a distance of one numeral to register "1" at the slot 79. When the racks 25 turn, they will transmit their relative motions to pinions 21 to turn shafts 22, which latter turns gears 58 and 71 and star-wheels 78, the latter turning registering-wheels 47 a distance in proportion to the racks 25, with which their operating-pinions 21 are in mesh. Hence the indicator-wheel at the right will be turned to expose "5" at the opening 49, and the others will be turned in like manner to record on the registering-wheels the number "56,785," which is the multiplicand, and the indicating-wheel 80 at the right will indicate the lowest digit "1" of the multiplier. To multiply by the next digit of the multiplier, which is "4," the operator may grasp finger-bar 85, Figs. 1 and 2, and slide the indicator-wheels 80 to the right, moving the extreme right wheel 80, having the numeral "1" exposed, out of mesh with star-wheel 94, and the next one exposing "0" in mesh therewith. This movement of the indicator-wheels 80 slides rack 84 and turns gears 86, 87, 88, and 91 to turn plate 41 and move the registering-wheel 47 to the right out of mesh with star-wheel 78, simultaneously bringing into action the sixth recorder-wheel to the left, or this movement can be affected by turning knob or button 55 and plate 41, the transmission of motion being just the reverse of that above described. The knob 40 is then turned a distance of four unit angles, as designated by the pointer 33. This movement will be transmitted to turn racks 25, pins 21, and shafts 22 in relative ratio, as above explained. As each registering-wheel 47 makes a complete revolution its pawl will engage bell-crank lever 68, swing lever 65, and slide ratchet-sleeve 63 to the rear, and owing to the cam action of the internally-grooved ratchet-sleeve 63 on web 64 the ratchet-sleeve will be turned slightly forward. This forward movement of ratchet-sleeve 63 will, through the medium of pawl 62, turn gears 58 and 71 and star-wheel 78 to turn the registering-wheel 47 at the left a distance of one numeral on its periphery, and thus register the tens. When pawl 67 passes bell-crank lever 68, spring 70 will return lever 65 and ratchet-sleeve 63 to their former position, pawl 60 and ratchet-wheel 61 preventing any return movement of gear 58, and the cam action of the web 64 in ratchet-sleeve 63 is compensated for by the ratchet-sleeve turning beneath the pawl 62. When the knob 40 has turned four unit angles, the registering-wheels will bear the number "2328185" and the indicating-wheels will show "41." The finger-bar 85 or knob 55 is operated to slide the indicating-wheels 80 to the right, bringing the next wheel in mesh with star-wheel 94 and turning plate 41 to move the second indicator-wheel 47 from the right out of contract with a star-wheel 78, at the same time bringing into operation the seventh indicator-wheel from the one to the right on which appears the numeral "5." The operator then turns knob 40 a distance of three unit angles, the value of the next digit of the multiplier, the third indicator-wheel 80 being turned to indicate "3" at the slot 79 and the registering-wheels being turned their proper relative ratio, exposing the number "19,363,685." The operator can then glance at the indicating-disks 80, and if they indicate the proper multiplier and the pointers on button 16 indicate the proper multiplicand the answer as set up on the registering-wheels 47 must be correct. After the result has been obtained the operator pushes the button 77 midway, which slides the pairs of bevel-gears so that neither set will engage the beveled gears beside the star-wheels. Then he pushes button 55 to force in band or collar 53 and move all of the levers 51, which latter, by their engagement with the heart-shaped cams 50 beside wheels 47, turn all of them to register the "0" on their peripheries at the openings 49 in plate 41. If it is desired to turn any one or more than one wheel 47 without disturbing the others, the punch-bar 104 is inserted through the openings 103 in plate 41 to operate any lever 65 desired, and thus turn any registering-wheel to "0." The indicator-wheels 80 are turned to "0" by pushing in bar 96, which latter, owing to its elevation or lateral movement by the pins 97 in slots 102, releases all the indicator-wheels 80 and their counterweights 101 return them to "0." The bar 96 is then permitted to fall to its locking position, and the indicator-wheels 80 can be slid back to the left by means of finger-bar 85, which is pulled down slightly to raise rack 84 from gear 86 and dropped into mesh therewith when the adjustment of the indicator-wheels is completed.

In addition the operator moves buttons 16 in their slots 17 to set up one of the numbers to be added. This movement of buttons will, as before explained, move pinions 21 to the proper racks 25. By moving knob 40 a distance of one unit angle the number will be set up on registering-wheels 47. The next number to be added is set up by moving buttons 16 and the knob 40 turned one unit angle, which will add to the number first set up on indicator-wheels 47 the second number set up by the buttons 16, and this operation can be repeated until all the numbers have been set up by buttons 16 and the knob 40 turned one unit angle each time, when the result of this addition will appear on registering-wheels 47. The wheels 47 can then be returned to "0" in the same manner as described for multiplication.

In working out problems in division and subtraction the button 77 is moved downward, which moves slide-bar 72, and through the medium of arms 75, bands 76, and the pins 76 in slots 73 of bar 72 the sleeves 57 will be moved longitudinally on shafts 22 to throw gears 58 out of mesh with gears 71 and gears 59 into mesh therewith, so that when the shafts 22 are turned motion will be transmitted to star-wheels 78 and registering-wheels 47 to turn them in a direction reverse to that when performing problems in multiplication and addition.

To divide fifty-six million seven hundred and thirty-two thousand one hundred and nine by three hundred and fifty-four, the operator sets up the number "56,732,109" on the registering-wheels 47. This can be done by inserting the finger-nail or a suitable tool through the openings 49 and turning the wheels, or the number can be set up by the buttons 16 and knob 40 turned one unit angle, when, before the operation of division begins, the indicator-wheels 80 must be turned back to "0." The divisor "354" is then set up by buttons 16, and the operator places the first portion of dividend greater than divisor on the left of the arrow by turning the circular plate 41 the proper direction and distance. He then turns knob 40 a distance of as many complete unit angles as "354" will go into the first three numbers ("567") of the dividend, which is only one. This will be indicated by the first indicator-wheel 80 to the left, the indicator-wheels being first pushed over to the extreme right of the machine. The operator then turns plate 41 to the left, either by turning knob 55 or moving finger-bar to bring the next star-wheel to the right into operation. The registering-wheels will then show the number "21332109." The operator then turns knob 40 as many unit angles until there is not a sufficient remainder of "2133" left to be divided by "354," which will be six times, and hence the numeral "6" will appear on the next indicator-disk 80. This operation is repeated until there is not a sufficient remainder left on the registering-wheels 47 to be divided by "354," when ciphers can be added and a decimal-point indicated in the result. The result will appear on indicator-disks 80, the divisor will be indicated by the pointer on buttons 16, and the remainder will appear on the registering-wheels 47. The decimal-point can be indicated by pointer which is free and can be moved at will.

In subtraction one number is set up on the registering-wheels 47 and the other number set up by the buttons 16, when a turn of the knob 40 one unit angle will subtract the number set up by the buttons 16 from the number on the registering-wheels, leaving on the registering-wheels the result of the subtraction.

Moreover, it will be seen that during any operation of the machine the registering-wheels in action are always connected by gears with the actuating-knob, and consequently do not need any frictional flaps or other devices to keep them from turning too far by their own momentum when the knob is stopped. The doing away with such flaps or devices thus minimizes friction, makes the machine easy to operate, and also makes it more durable and accurate.

By arranging the registering-wheels 47 in a circle or endless train the capacity of the machine is unlimited, as new wheels can be brought into operation one at a time, and if all have been in operation the numerals on the idle wheels can be copied down, said wheels brought to "0," and the operation repeated until the result is obtained. This is, I believe, an improvement on all machines of this character heretofore known.

A great many changes might be made in the general form and arrangement of the parts described without departing from my invention, and hence I would have it understood that I do not restrict myself to the precise details set forth, but consider myself at liberty to make such changes and alterations as fairly fall within the spirit and scope of my invention.

Having fully described my invention, what I claim as new, and desire to secure by Letters Patent, is—

1. In a calculating-machine, the combination with a series of result-indicators, of a series of racks, means for turning all of said racks simultaneously but moving each rack differently but in the same relative ratio, and coöperating mechanism connecting any one of said racks with any one or more result-indicators.

2. In a calculating-machine, the combination of a series of endless racks, means for turning said racks simultaneously moving each rack differently but at the same relative ratio, and movable gears transmitting motion to the result-indicators and adapted to be moved into mesh with any of said racks.

3. In a calculating-machine, the combination of a series of endless racks, means for turning all of said racks simultaneously but different distances in the same relative ratio from one to nine, a series of result-indicators, and a movable gear for each result-indicator adapted to be moved into mesh with any of said racks.

4. In a calculating-machine, the combination with a series of registering-wheels, star-wheels for turning the same, a series of shafts, and means for turning them different relative distances, of sleeves loosely mounted on said shafts and carrying facing beveled gears, gears fixed to turn with the star-wheels and in mesh with one of said sleeve-gears, a ratchet-sleeve on each shaft, a pawl connecting the gear-sleeve with said ratchet-sleeve, an inclined web on each shaft keying the ratchet-sleeve thereto, and means operated by a registering-wheel to move the ratchet-sleeve longitudinally and advance the gearing and adjacent indicating-wheel by reason of the inclined web, to register the tens.

5. In a calculating-machine, the combination with a series of registering-wheels, star-wheels for turning the same, a series of shafts, and means for turning them different relative distances, of sleeves loosely mounted on said shafts and carrying facing beveled gears, gears fixed to turn with the star-wheels and in mesh with one of said sleeve-gears, a ratchet-sleeve on each shaft, a pawl connecting the gear-sleeve with said ratchet-sleeve, a pawl and ratchet compelling the turning of the gear-sleeve in one direction only, an inclined web on each shaft keying the ratchet-sleeve thereto, levers pivoted at one end and projecting at their other ends into annular grooves in the ratchet-sleeves, and bell-crank levers operated by tappets on the registering-wheels to move the ratchet-sleeves longitudinally against the inclined webs and advance the adjacent registering-wheel to register the tens.

6. In a calculating-machine, the combination with a series of registering-wheels, star-wheels to turn the registering-wheels, a series of shafts, and means for turning said shafts different relative distances, of sleeves loose on each shaft, beveled facing-gears on each sleeve, means for keying said sleeves to the shafts, beveled gears fixed to turn with the star-wheels, and means for sliding said sleeves longitudinally to move either of the beveled gears thereon into mesh with the gears fixed to the star-wheels and in position to be out of gear altogether.

7. In a calculating-machine, the combination with a series of registering-wheels, a series of driving-shafts, and means for turning said shafts different relative distances, of star-wheels in mesh with said registering-wheels, beveled gears on said star-wheels, sleeves keyed to slide on said shafts, beveled facing-gears on said sleeves, bands around the sleeves having arms thereon, a slide-bar mounted in slots in said arms, and pins located in inclined slots in said bar, so that when said bar is moved longitudinally it will be moved laterally by the pins to throw the arms and sleeves and move either of said sleeve-gears into mesh with the star-wheel gears, or out of gear altogether.

8. In a calculating-machine, the combination with a rotary plate, of an endless chain of registering-wheels carried thereby means for operating any of said registering-wheels, heart-shaped cams on the side of the registering-wheels, levers to engage the cams and turn the registering-wheels back to zero, a band or sleeve in engagement with all of said levers, and a push-button to move the sleeve or band and operate all of said levers simultaneously.

9. In a calculating-machine, the combination with a rotary plate, an endless chain or series of registering-wheels carried by said plate, and means for turning any of said registering-wheels, of heart-shaped cams secured to the side of the registering-wheels, levers pivoted between their end and having their outer ends in position to engage said cams, a sleeve in position to engage the inner ends of all of said levers, a button to force the band or sleeve inward, operate all the levers and return the registering-wheels to zero, and said plate having openings therein through which a push-bar can be inserted to operate any one of said levers independently.

10. In a calculating-machine, the combination of nine endless racks, means for simultaneously turning said racks different distances but in the same relative ratio from one to nine, a series of registering-wheels, pinions for operating said registering-wheels, and means for moving said pinions into mesh with any one or series of racks.

11. In a calculating-machine, the combination of nine endless racks, means for simultaneously turning said racks different distances but in the same relative ratio from one to nine a series of registering-wheels, a series of shafts, gearing connecting said shafts and registering-wheels, and pinions, keyed to slide on said shafts and movable into mesh with any of said racks.

12. In a calculating-machine, the combination of nine endless racks, means for simultaneously turning said racks different distances but in the same relative ratio from one to nine, a series of registering-wheels, a series of shafts, gearing connecting said shafts with the registering-wheels, pinions keyed to slide on said shafts and movable into mesh with any of said racks, and bars having their edges between the teeth of the pinions to prevent turning of the pinions and guide them into mesh with the racks, and said bars having notches therein opposite the racks to permit the pinions to turn when in mesh therewith.

13. In a calculating-machine, the combination of nine endless racks, means for simultaneously moving the racks different distances but in the same relative ratio from one to nine, registering-wheels, shafts to turn the same, pinions keyed to slide on said shafts, buttons to move said pinions on the shafts, and scales from "0" to "9" beside said buttons to register the position of the pinion when the button is moved.

14. In a calculating-machine, the combination of nine endless racks, means for simultaneously moving the racks different distances but in the same relative ratio from one to nine, registering-wheels, shafts for operating them, pinions keyed to slide on said shafts, sliding racks, arms on said racks engaging annular grooved hubs on the pinions, toothed wheels engaging the racks, gears fixed to turn with the toothed wheels, segmental levers engaging said gears, and sliding buttons operating said levers and movable in scale-marked slots in the machine-casing.

15. In a calculating-machine, the combination with a shaft, and means for turning the same, of nine spur-gears secured on said shaft but of different diameters and number of teeth in the same ratio from one to nine, nine endless racks turning about said spur-gears, connecting-gears between the spur-gears and racks, registering-wheels, and means for transmitting motion from the racks to the registering-wheels.

16. In a calculating-machine, the combination with a shaft, and means for turning the same, of nine spur-gears secured on said shaft but of different diameter and number of teeth in the same ratio from one to nine, nine endless racks turning about said spur-gears, a connecting-gear between each spur-gear and rack, registering-wheels, a series of shafts, means for gearing said shafts with the registering-wheels to turn the latter, and pinions keyed to slide on said shafts and adapted to be moved into mesh with any of said racks.

17. In a calculating-machine, the combination with a shaft and means for turning the same, of nine spur-gears secured on said shaft but of different diameter and number of teeth in the same ratio from one to nine, nine circular internally and externally toothed racks to turn about said spur-gears, supporting-arms for the racks to turn about the shaft between the spur-gears, a connecting-gear between each spur-gear and rack, registering-wheels, shafts to turn them, pinions keyed to slide on the shafts into mesh with any of said racks and means for locking said pinions against turning except when in mesh with a rack.

18. In a calculating-machine, the combination of nine endless racks, means for turning all of said racks simultaneously but at different speeds in the same ratio from one to nine, a series of star-wheels arranged in curved formation, a series of shafts, transmitting mechanism between said shafts and star-wheels, pinions keyed to slide on said shafts and adapted to be moved into mesh with any of said racks, a rotary plate, and an endless circular chain of registering-wheels having notched peripheries, and adapted to be moved by said plate into mesh or engagement with the star-wheels.

19. In a calculating-machine, the combination with a series of registering-wheels, and means for operating said wheels to designate thereon the result of mathematical problems, of a pointer controlled by said operating means to designate the unit angles through which said operating mechanism turns, and indicating-wheels operated by said means to indicate the unit angles and the digits of one number of the problem.

20. In a calculating-machine, the combination of a series of nine endless racks, means for simultaneously turning them different distances but in the same ratio from one to nine, registering-wheels operated by said racks, a knob to operate said means, and a pointer and scale turned simultaneously with the racks to indicate the unit angles through which the racks are turned.

21. In a calculating-machine, the combination of a series of nine endless racks, means for simultaneously turning them different distances but in the same ratio from one to nine, registering-wheels operated by said racks, a shaft, a pointer secured on said shaft and registering with a dial or scale to indicate the unit angles the racks are turned, and a gear-wheel on said shaft meshing with one of said racks.

22. In a calculating-machine, the combination with registering-wheels and means for operating them, of indicator-wheels for indicating the digits of a number in accordance with the unit angles the operating mechanism is moved, and counterweights on said indicator-wheels to return them to zero when released.

23. In a calculating-machine, the combination of a circular rotary plate having a toothed periphery, an endless chain of registering-wheels carried by said plates, means for operating any series of registering-wheels, a series of indicator-wheels adapted to indicate the operation of the registering-wheels, and means controlled by the toothed periphery of the plates for moving the series of indicator-wheels longitudinally simultaneously with a rotary movement of the plate.

24. In a calculating-machine, the combination with a rotary circular plate having a toothed periphery, a series of registering-wheels carried by said plate, means for operating said registering-wheels, a shaft, a tube thereon, a series of rotary indicating-wheels on said tube, and means controlled by the toothed periphery of the plate for moving the tube longitudinally when the plate is turned.

25. In a calculating-machine the combination with a circular rotary toothed plate, a series of registering-wheels carried thereby and means for operating said registering-wheels, of a shaft above the plate, a tube mounted to slide on said shaft, a series of indicating-wheels on said shaft, a star-wheel operated by the registering-wheel-operating mechanism, and means for sliding the tube to bring any of the indicating-wheels into operative engagement with said star-wheel.

26. In a calculating-machine, the combination with a circular rotary toothed plate, a series of registering-wheels thereon, and means for operating said registering-wheels, of a shaft above the plate, a tube mounted to slide thereon, indicating-wheels mounted to rotate around said tube, a rack, bars connecting the same with the tube and one of said bars serving as a finger-hold to move the tube and indicating-wheels thereon longitudinally, a star-wheel controlled by the registering-wheel-operating mechanism, and gearing between the rack and toothed plate to compel their simultaneous movement.

27. In a calculating-machine, the combination with a rotary circular plate having a toothed periphery, registering-wheels carried by said plate, and means for operating said registering-wheels, of a shaft above the toothed plate, a tube mounted to slide on said shaft, a series of rotary indicating-wheels on said tube, a rack, bars connecting the rack with the tube, a chain of gears connecting the rack with the toothed plate, a finger-hold on one bar to permit the movement of the tube and indicating-wheels longitudinally and to permit the rack to be elevated out of mesh with its connecting chain of gears, and means operated by the registering-wheel-operating mechanism to control the rotary movement of the indicating-wheels.

In testimony whereof I have signed this specification in the presence of two subscribing witnesses.

WILLIAM H. ROBERTSON.

Witnesses:
 WM. McKENNA,
 A. WINGATE.